United States Patent
Miyamoto et al.

(10) Patent No.: US 12,466,064 B2
(45) Date of Patent: Nov. 11, 2025

(54) INTERFERENCE DETERMINATION DEVICE, ROBOT CONTROL SYSTEM, AND METHOD FOR DETERMINING INTERFERENCE

(71) Applicant: KYOCERA Corporation, Kyoto (JP)

(72) Inventors: Takuya Miyamoto, Kadoma (JP); Masato Mori, Osaka (JP); Kazuki Ono, Osaka (JP); Sho Bunno, Osaka (JP)

(73) Assignee: KYOCERA Corporation, Kyoto (JP)

( * ) Notice: Subject to any disclaimer, the term of this patent is extended or adjusted under 35 U.S.C. 154(b) by 199 days.

(21) Appl. No.: 18/269,242

(22) PCT Filed: Dec. 23, 2021

(86) PCT No.: PCT/JP2021/048017
§ 371 (c)(1),
(2) Date: Jun. 22, 2023

(87) PCT Pub. No.: WO2022/138864
PCT Pub. Date: Jun. 30, 2022

(65) Prior Publication Data
US 2024/0051135 A1  Feb. 15, 2024

(30) Foreign Application Priority Data

Dec. 23, 2020 (JP) ................ 2020-214160

(51) Int. Cl.
*B25J 9/16* (2006.01)
*G06T 1/00* (2006.01)
(Continued)

(52) U.S. Cl.
CPC ........... *B25J 9/1666* (2013.01); *B25J 9/1697* (2013.01); *G06T 1/0014* (2013.01); *G06T 7/55* (2017.01);
(Continued)

(58) Field of Classification Search
CPC ...... B25J 9/1676; B25J 9/1666; B25J 9/1697; G05B 2219/39082; G05B 2219/39091;
(Continued)

(56) References Cited

U.S. PATENT DOCUMENTS 9,616,572 B2  4/2017  Watanabe
10,675,763 B2  6/2020  Watanabe
(Continued)

FOREIGN PATENT DOCUMENTS

JP  2004202627 A  7/2004
JP  2006338389 A  12/2006
(Continued)

*Primary Examiner* — Wade Miles
*Assistant Examiner* — Zachary Joseph Wallace
(74) *Attorney, Agent, or Firm* — Procopio, Cory, Hargreaves & Savitch LLP

(57) ABSTRACT

An interference determination device includes a controller that determines interference between a robot and an object. The controller obtains a plurality of vertices of at least one object within a motion range of the robot in a real space and positional information regarding the plurality of vertices. The controller determines interference between the robot and the object in the real space on a basis of the plurality of vertices and the positional information.

15 Claims, 6 Drawing Sheets

(51) Int. Cl.
  *G06T 7/55*     (2017.01)
  *G06T 7/73*     (2017.01)
  *G06V 20/52*    (2022.01)
(52) U.S. Cl.
  CPC ............... *G06T 7/73* (2017.01); *G06V 20/52* (2022.01); *G06T 2207/30232* (2013.01)
(58) Field of Classification Search
  CPC .......... G05B 2219/40317; G05B 2219/40339; G05B 2219/40607; G05B 2219/40613; G06T 1/0014; G06T 7/73; G06T 7/55; G06T 2207/30232; G06V 20/52
  See application file for complete search history.

(56)         References Cited

U.S. PATENT DOCUMENTS

| 11,097,420  | B2  | 8/2021  | Fujii |
| 2019/0337154 | A1* | 11/2019 | Holson ................. B25J 9/1697 |
| 2020/0230821 | A1  | 7/2020  | Watanabe et al. |
| 2021/0138655 | A1* | 5/2021  | Mousavian ............... G06T 7/70 |
| 2023/0364803 | A1* | 11/2023 | Narita .................... B25J 19/023 |
| 2024/0009851 | A1* | 1/2024  | Mousavian ............. B25J 9/1697 |

FOREIGN PATENT DOCUMENTS

| JP | 2008033522   | A  | 2/2008 |
| JP | 2015009314   | A  | 1/2015 |
| JP | 2018017654   | A  | 2/2018 |
| JP | 2018-144163  | A  | 9/2018 |
| JP | 2019198914   | A  | 11/2019 |
| WO | 2019230037   | A1 | 12/2019 |

* cited by examiner

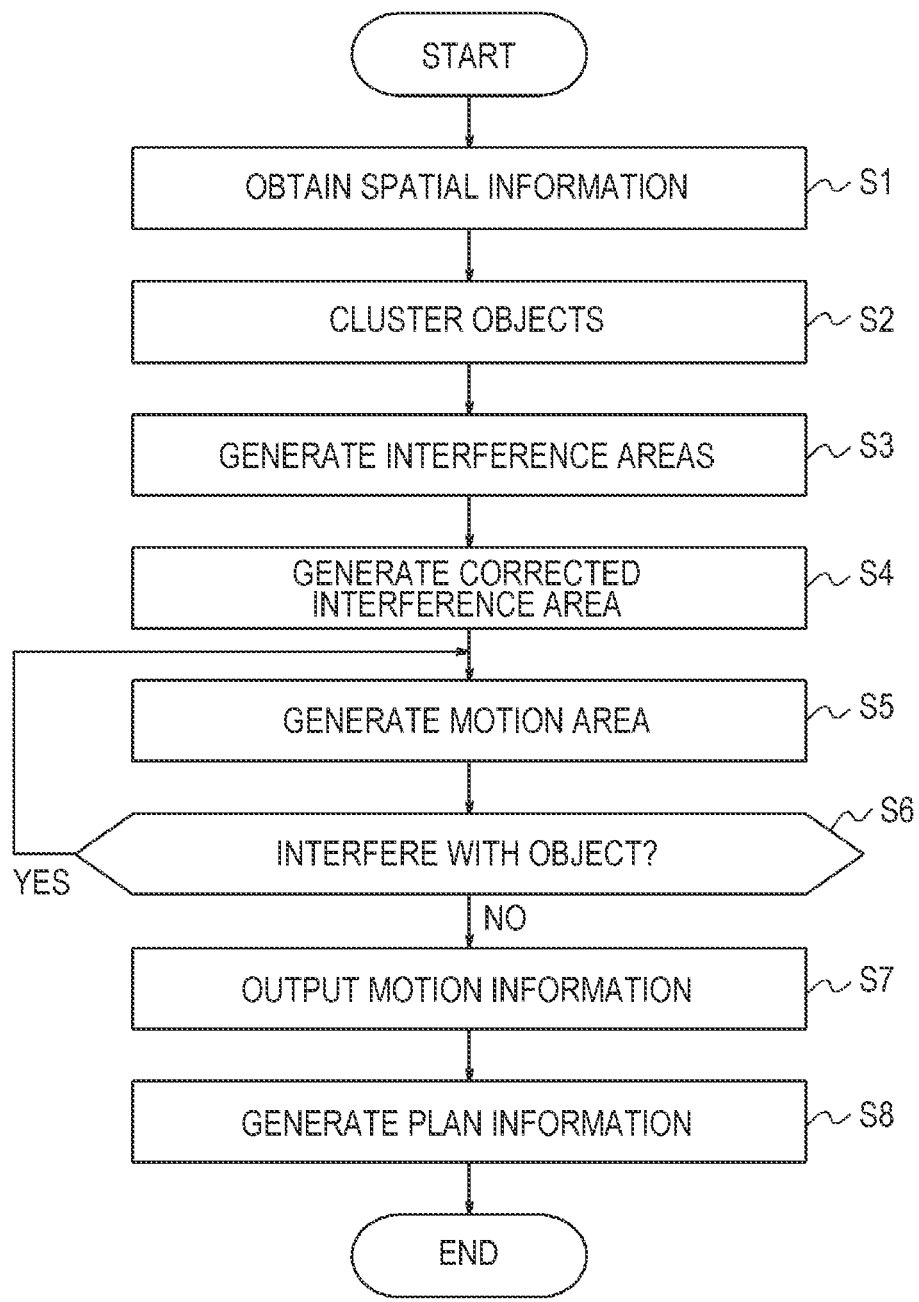

INTERFERENCE DETERMINATION DEVICE, ROBOT CONTROL SYSTEM, AND METHOD FOR DETERMINING INTERFERENCE

CROSS-REFERENCE TO RELATED APPLICATIONS

The present application claims priority to Japanese Patent Application No. 2020-214160 (filed Dec. 23, 2020), and the contents of this application is incorporated herein by reference in their entirety.

TECHNICAL FIELD

The present disclosure relates to an interference determination device, a robot control system, and a method for determining interference.

BACKGROUND OF INVENTION

Methods used by robots to avoid objects are known. Patent Literature 1, for example, describes an apparatus that converts a three-dimensional robot model into a two-dimensional robot model and that determines interference of the two-dimensional model.

CITATION LIST

Patent Literature

Patent Literature 1: Japanese Unexamined Patent Application Publication No. 2004-202627

SUMMARY

In an embodiment of the present disclosure, an interference determination device includes a controller that determines interference between a robot and an object. The controller obtains a plurality of vertices of at least one object within a motion range of the robot in a real space and positional information regarding the plurality of vertices. The controller determines interference between the robot and the object in the real space on a basis of the plurality of vertices and the positional information.

In another embodiment of the present disclosure, a robot control system includes the interference determination device, an operation amount generation device that generates an amount of operation for the robot on a basis of a route planned by the interference determination device, and the robot.

In another embodiment of the present disclosure, a method for determining interference includes obtaining a plurality of vertices of at least one object within a motion range of a robot in a real space and positional information regarding the plurality of vertices and determining interference between the robot and the object in the real space on a basis of the plurality of vertices and the positional information.

BRIEF DESCRIPTION OF THE DRAWINGS

FIG. 8 is a flowchart illustrating an example of a procedure of a method for determining interference performed by an interference determination device.

DESCRIPTION OF EMBODIMENTS

A method for converting a three-dimensional robot model into a two-dimensional robot model is difficult to apply to a manipulator capable of freely moving in a three-dimensional space. In order to calculate a route plan for such a manipulator to avoid objects, a position and an attitude of each of links of the manipulator need to be taken into consideration. Convenience of a robot when the robot avoids objects needs to be improved.

(Example of Configuration of Robot Control System 1)

Figure 1:
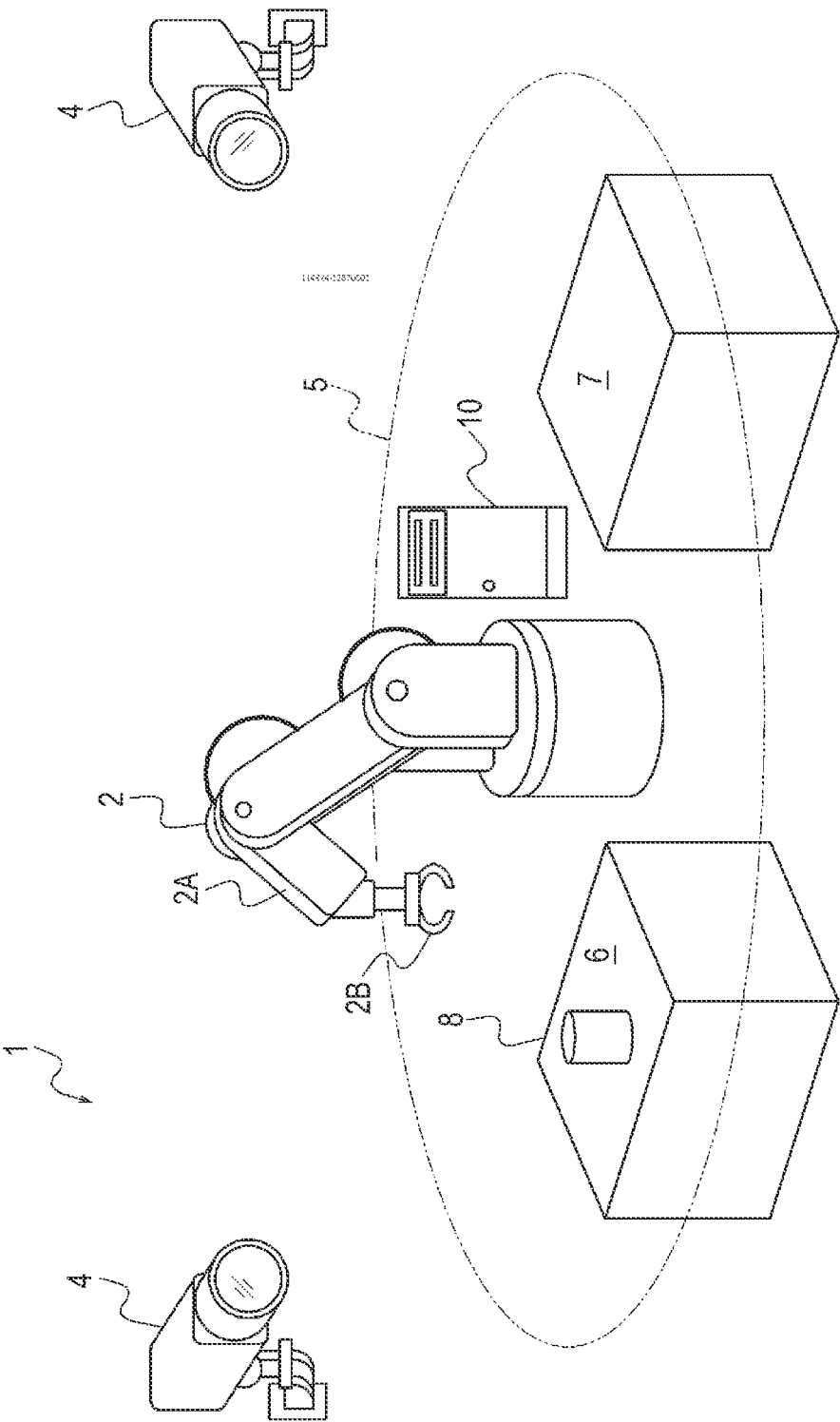
FIG. 1 is a schematic diagram illustrating an example of configuration of a robot control system according to an embodiment.

In an embodiment, a robot control system 1 includes a robot 2 and a robot control apparatus 10 as illustrated in FIG. 1. The robot 2 is assumed to move a workpiece 8 from an operation start point 6 to an operation target point 7 in the present embodiment. That is, the robot control apparatus 10 controls the robot 2 such that the workpiece 8 moves from the operation start point 6 to the operation target point 7. The workpiece 8 will also be referred to as an operation target.

Figure 2:
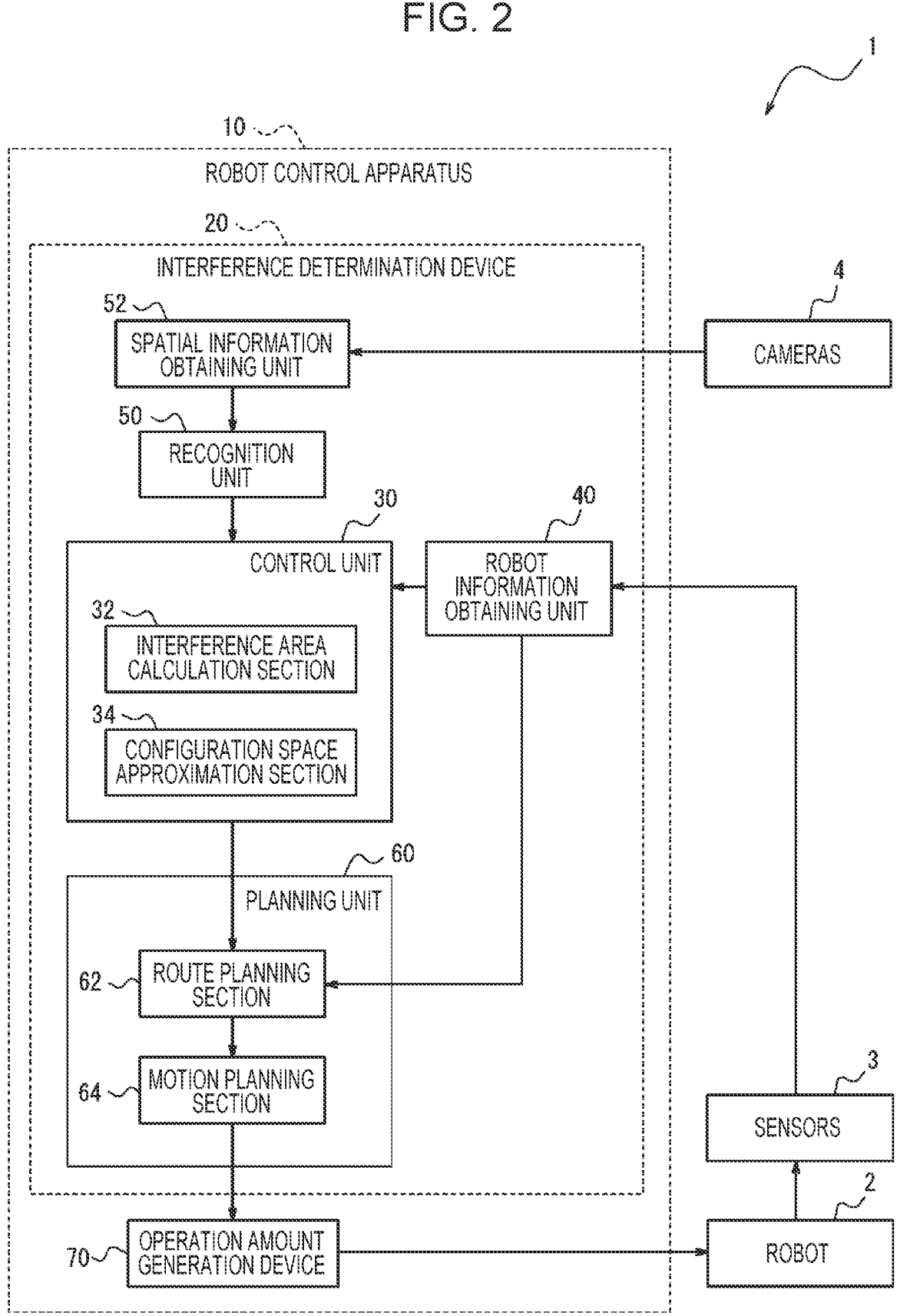
FIG. 2 is a block diagram illustrating the example of the configuration of the robot control system according to the embodiment.

As illustrated in FIG. 2, the robot control apparatus 10 includes an interference determination device 20 and an operation amount generation device 70. The robot control apparatus 10 controls the robot 2 on the basis of information regarding a space where the robot 2 moves. The information regarding a space will also be referred to as spatial information. Components of the robot control system 1 will be described hereinafter with reference to FIGS. 1 and 2.

<Robot 2>

The robot 2 includes an arm 2A and an end effector 2B. The arm 2A may be, for example, a six-axis or seven-axis vertically articulated robot. The arm 2A may be a three-axis or four-axis horizontally articulated robot or a SCARA robot, instead. The arm 2A may be a two-axis or three-axis Cartesian coordinate robot, instead. The arm 2A may be a parallel link robot or the like, instead. The number of axes of the arm 2A is not limited to those mentioned above as examples. In other words, the robot 2 includes the arm 2A articulated with a plurality of joints and moves by driving the joints thereof. The arm 2A can also be regarded as including a plurality of joints. More specifically, the arm 2A can also be regarded as including a plurality of joints and a plurality of links connecting the plurality of joints to each other.

The end effector 2B may include, for example, a gripping hand capable of gripping the workpiece 8. The gripping hand may include a plurality of fingers. The number of fingers of the gripping hand may be two or more. The fingers of the gripping hand may each include one or more joints. The end effector 2B may include a suction hand capable of sucking on the workpiece 8. The end effector 2B may include a scooping hand capable of scooping the workpiece 8. The end effector 2B may include a tool such as a drill and be capable of performing various types of processing on the workpiece 8, such as drilling. The end effector 2B is not limited to these examples and may be capable of performing various other operations, instead. In the configuration illustrated in FIG. 1, the end effector 2B includes a gripping hand.

The robot 2 can control a position of the end effector 2B by moving the arm 2A. The end effector 2B may include an axis that serves as a reference for a direction in which the end effector 2B performs an operation on the workpiece 8. When the end effector 2B includes an axis, the robot 2 can control a direction of the axis of the end effector 2B by moving the arm 2A. The robot 2 controls a start and an end of a motion of the end effector 2B for the workpiece 8. The robot 2 can move or process the workpiece 8 by controlling a motion of the end effector 2B while controlling the position of the end effector 2B or the direction of the axis of the end effector 2B. In the configuration illustrated in FIG. 1, the robot 2 causes the end effector 2B to grip the workpiece 8 at the operation start point 6 and move the end effector 2B to the operation target point 7. The robot 2 causes the end effector 2B to release the workpiece 8 at the operation target point 7. The robot 2 can thus move the workpiece 8 from the operation start point 6 to the operation target point 7.

<Sensors 3>

As illustrated in FIG. 2, the robot control system 1 also includes sensors 3. The sensors 3 detect physical information regarding the robot 2. The physical information regarding the robot 2 may include information regarding an actual position or attitude of each of the components of the robot 2 or velocity or acceleration of each of the components of the robot 2. The physical information regarding the robot 2 may include information regarding force acting upon each of the components of the robot 2. The physical information regarding the robot 2 may include information regarding a current flowing to, or torque of, a motor that drives each of the components of the robot 2. The physical information regarding the robot 2 indicates a result of an actual motion of the robot 2. That is, the robot control system 1 can grasp a result of an actual motion of the robot 2 by obtaining the physical information regarding the robot 2.

The sensors 3 may include a force sensor or a tactile sensor that detects, as the physical information regarding the robot 2, force, distributed pressure, sliding, or the like acting upon the robot 2. The sensors 3 may include a motion sensor that detects, as the physical information regarding the robot 2, a position or an attitude of the robot 2 or velocity or acceleration of the robot 2. The sensors 3 may include a current sensor that detects, as the physical information regarding the robot 2, currents flowing to motors for driving the robot 2. The sensors 3 may include a torque sensor that detects, as the physical information regarding the robot 2, torque of the motors for driving the robot 2.

The sensors 3 may be provided at the joints of the robot 2 or joint driving units for driving the joints. The sensors 3 may be provided at the arm 2A or the end effector 2B of the robot 2, instead.

The sensors 3 output the detected physical information regarding the robot 2 to the robot control apparatus 10. The sensors 3 detect and output the physical information regarding the robot 2 at certain timings. The sensors 3 output the physical information regarding the robot 2 as time-series data.

<Cameras 4>

The robot control system 1 in the configuration example illustrated in FIG. 1 includes two cameras 4. The cameras 4 can capture images of an object, a human, or the like within an effect range 5, where the motion of the robot 2 can be affected. The images captured by the cameras 4 may include monochromatic luminance information or luminance information regarding colors indicated by RGB (red, green, and blue) or the like. The effect range 5 includes a motion range of the robot 2. The effect range 5 is obtained by extending the motion range of the robot 2 further outward. The effect range 5 may be set such that the robot 2 can be stopped before a human or the like who is moving from the outside of the motion range of the robot 2 to the inside of the motion range enters the motion range of the robot 2. The effect range 5 may be set as a range obtained, for example, by extending the motion range of the robot 2 outward by a certain distance from a boundary of the motion range. The cameras 4 may be provided in such a way as to be able to capture, from above, images of the effect range 5 or the motion range of the robot 2 or an area around the effect range 5 or the motion range. The number of cameras 4 is not limited to two, and may be one, or three or more, instead.

<Robot Control Apparatus 10>

The robot control apparatus 10 may include at least one processor in order to provide control and processing ability to execute various functions. Each of the components of the robot control apparatus 10 may include at least one processor. The interference determination device 20, for example, may include at least one processor. Some of the components of the robot control apparatus 10 may be achieved by one processor, instead. The entirety of the robot control apparatus 10 may be achieved by one processor, instead. The processor can execute a program for achieving the various functions of the robot control apparatus 10. The processor may be achieved as a single integrated circuit. The integrated circuit is also called an IC (integrated circuit). The processor may be achieved as a plurality of integrated circuits and discrete circuits communicably connected to one another. The processor may be achieved on the basis of one of various other known techniques.

The robot control apparatus 10 may include a storage unit. The storage unit may include a magnetic storage medium such as a magnetic disk or a memory such as a semiconductor memory or a magnetic memory. The storage unit stores various pieces of information, programs to be executed by the robot control apparatus 10, and the like. The storage unit can also store, for example, information obtained or generated by elements included in the robot control apparatus 10. The storage unit may be configured as a non-transitory readable medium, instead. The storage unit may function as a work memory of the robot control apparatus 10. At least part of the storage unit may be configured separately from the robot control apparatus 10.

The robot control apparatus 10 may be configured as a server apparatus, instead. The server apparatus may include at least one computer. The server apparatus may cause a plurality of computers to perform parallel processing. The server apparatus need not include a physical housing and may be configured on the basis of a virtualization technology such as a virtual machine or a container orchestration system. The server apparatus may be configured using a cloud service. When the server apparatus is configured using a cloud service, the server apparatus can be configured by combining a managed service. That is, the functions of the robot control apparatus 10 can be achieved as the cloud service.

The server apparatus may include at least one server group. The server group functions as the robot control apparatus 10. The number of server groups may be one, or two or more. When the number of server groups is one, functions achieved by the server group encompass functions achieved by different server groups. The server groups are communicably connected to each other by wire or wirelessly.

Although FIGS. 1 and 2 illustrate the robot control apparatus 10 as one component, a plurality of components may be regarded as one system and operated as necessary. That is, the robot control apparatus 10 is configured as a platform with variable capacity. When a plurality of components is used as the robot control apparatus 10, operation of the system can be continued using available components even if one of the components can no longer be operated due to occurrence of a natural disaster or another unforeseen event. In this case, the plurality of components is communicably connected to one another over a wired or wireless network. The configuration of the plurality of components may be constructed across a cloud service and an on-premises environment.

The robot control apparatus 10 is connected to the robot 2, for example, over a wired or wireless network. The robot control apparatus 10 and the robot 2 both include a communication device employing a standard protocol and can communicate with each other in a bidirectional manner.

<Interference Determination Device 20>

As illustrated in FIG. 2, the interference determination device 20 includes a spatial information obtaining unit 52, a recognition unit 50, a control unit 30, a robot information obtaining unit 40, and a planning unit 60. The components of the interference determination device 20 will be described hereinafter.

<<Spatial Information Obtaining Unit 52>>

The spatial information obtaining unit 52 obtains, as spatial information, spatial point cloud information regarding objects in a space. The spatial point cloud information is information indicating a space using feature points. The spatial information obtaining unit 52 may obtain, as spatial information, RGB information regarding a space. The spatial information obtaining unit 52 outputs spatial information to the recognition unit 50. The RGB information is, for example, information indicating color information regarding a subject.

The robot control system 1 may include a visual sensor that detects spatial point cloud information. The spatial information obtaining unit 52 may obtain spatial point cloud information from the visual sensor. The visual sensor may be provided at a position from which a tip of the arm 2A of the robot 2, a tip of the end effector 2B, the entirety of the robot 2, the effect range 5 of the robot 2, or an area around the effect range 5 of the robot 2 can be seen from above.

The spatial information obtaining unit 52 may obtain captured images from the cameras 4. The spatial information obtaining unit 52 may include the cameras 4. The cameras 4 may be provided at the tip of the arm 2A of the robot 2 or the tip of the end effector 2B. The spatial information obtaining unit 52 obtains RGB information regarding captured images obtained from the cameras 4. The spatial information obtaining unit 52 may detect spatial point cloud information on the basis of depth information regarding the captured image. The depth information includes information regarding depth of subjects of the cameras 4. The depth information is, for example, information indicating a distance between a subject and a point of capture. As can be seen from the above description, the spatial point cloud information may include attribute information such as position coordinate information in an XYZ coordinate system and RGB information at each set of position coordinates.

<<Recognition Unit 50>>

The recognition unit 50 recognizes targets of an operation to be performed by the robot 2 and obtains information regarding the target on the basis of spatial information obtained from the spatial information obtaining unit 52. The recognition unit 50 may recognize the workpiece 8 as a target of an operation. The recognition unit 50 may recognize the operation start point 6 and the operation target point 7 as targets of an operation.

The recognition unit 50 recognizes objects while distinguishing, for example, targets of an operation from a background or objects such as obstacles, which are not targets of an operation. The recognition where objects are distinguished from one another is also called clustering. The recognition unit 50 may approximate clustered objects with polyhedra. The recognition unit 50 may obtain vertex information regarding polyhedra obtained as a result of approximation of objects. The recognition unit 50 may obtain spatial point cloud information regarding each of clustered objects. The recognition unit 50 may recognize each object without generating spatial point cloud information, instead.

The recognition unit 50 may recognize a motion to be made by the robot 2 by recognizing targets of an operation. The recognition unit 50 outputs, to the control unit 30, information regarding recognized targets of an operation or information regarding a motion to be made by the robot 2. Information recognized by the recognition unit 50 as information regarding an operation to be performed by the robot 2 will also be referred to as recognition information. The recognition information may include spatial point cloud information. The recognition information may include information regarding vertices of an object on which an operation is to be performed. The recognition information may include information regarding vertices of objects that are not a target of an operation. The objects that are not a target of an operation are will also be referred to as obstacles 80 (refer to FIG. 5 and other drawings). When the recognition unit 50 recognizes objects without generating spatial point cloud information, the recognition information may include information regarding outer shapes of the objects. Targets can be recognized through determinations made by AI or using a method such as template matching on the basis of obtained spatial information.

<<Robot Information Obtaining Unit 40>>

The robot information obtaining unit 40 may obtain physical information regarding the robot 2 as a result of detection performed by the sensors 3. The robot information obtaining unit 40 may obtain, through estimation, physical information that cannot be directly detected by the sensors 3. The robot information obtaining unit 40 outputs the obtained physical information to the control unit 30 and the planning unit 60.

<<Control Unit 30>>

The control unit 30 includes an interference area calculation section 32. The interference area calculation section 32 obtains recognition information from the recognition unit 50 and physical information regarding the robot 2 from the robot information obtaining unit 40. The interference area calculation section 32 determines interference between objects within the motion range of the robot 2 and the robot 2 on the basis of the recognition information and the physical information regarding the robot 2.

The interference area calculation section 32 determines interference between the robot 2 and objects in a space where the robot 2 performs an operation on a target object while avoiding obstacles 80. The space where the robot 2 performs an operation is also called a real space. The real space corresponds to a space visually recognized by a human as a space in reality.

Here, when the robot 2 moves by driving the joints thereof, a position and an attitude of the robot 2 in the real space are identified on the basis of the angles of the joints of the robot 2. Parameters for identifying the position and the attitude of the robot 2 are not limited to the angles of the joints driven in rotational directions. The parameters may include the amount of movement of parts driven in a traveling direction.

The position and the attitude of the robot 2 will be collectively referred to as a state of the robot 2. The robot 2 enters a different state by moving to a different position or achieving a different attitude. The state of the robot 2 is identified on the basis of a plurality of parameters. One combination of values of the parameters corresponds to one state of the robot 2. In other words, the state of the robot 2 is represented by a combination of the values of the parameters. The state of the robot 2 is represented by state vectors including the values of the parameters as elements. The state vectors are defined in a state space whose bases are the parameters. The state space whose bases are the parameters for identifying the state of the robot 2 will also be referred to as a configuration space.

Figure 3:
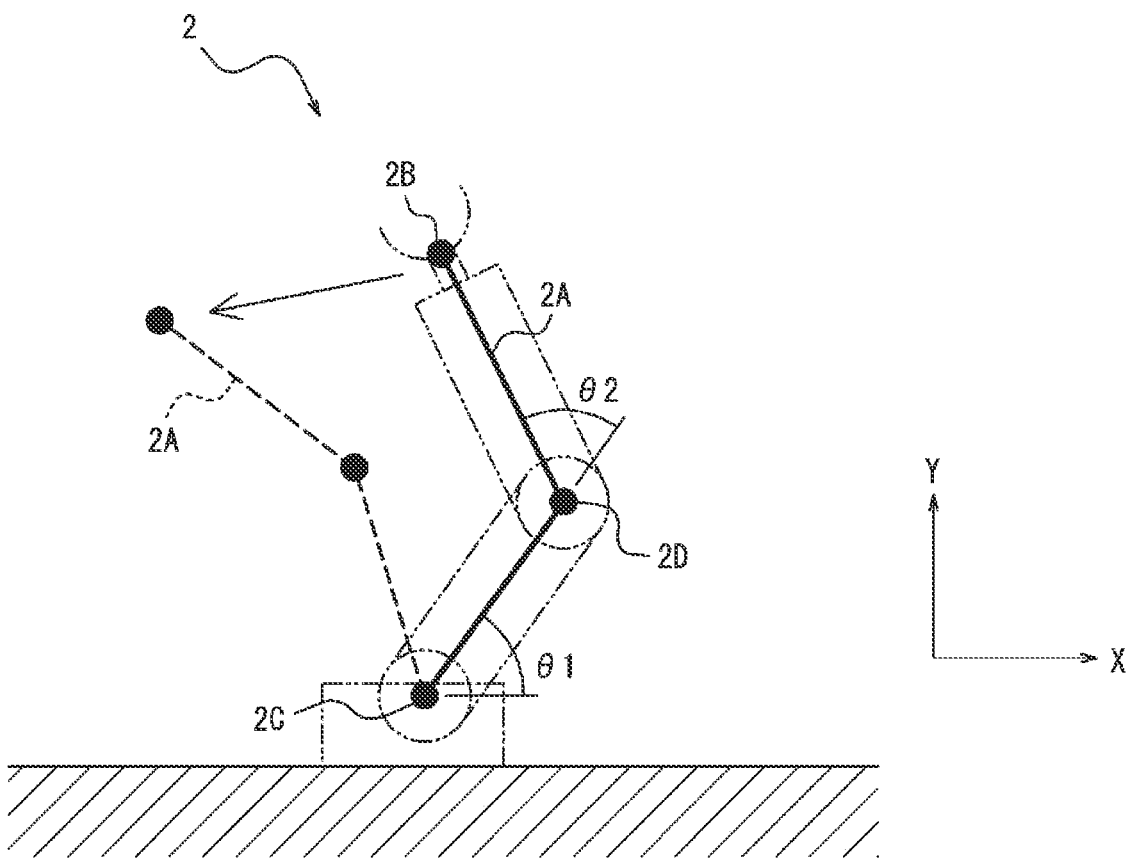
FIG. 3 is a diagram illustrating an example of a relationship between a position of an arm of a robot and angles of joints.

As an example, the state of the robot 2 will be described hereinafter. As illustrated in FIG. 3, the state of the robot 2 is identified on the basis of a position and an attitude of the arm 2A. The robot 2 also includes joints 2C and 2D. The position and the attitude of the arm 2A are assumed to be identified from a value of a driving angle θ1 of the joint 2C and a value of a driving angle θ2 of the joint 2D. That is, the state of the robot 2 is identified from the values of θ1 and θ2. The joints 2C and 2D are assumed to rotate the arm 2A on an XY plane. That is, the arm 2A of the robot 2 is located on the XY plane. θ1 and θ2 are angles defined on the XY plane.

Figure 4:
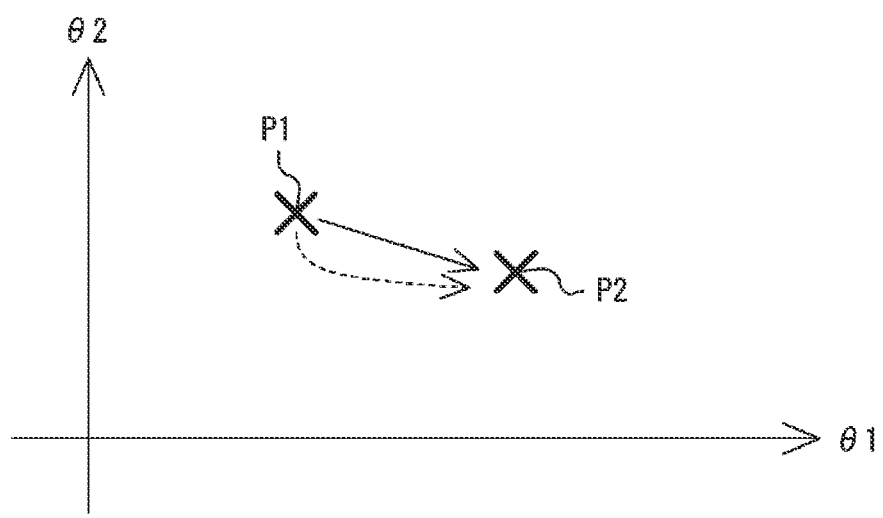
FIG. 4 is a diagram illustrating an example of a configuration space where the angles of the joints, which indicate a state of the robot, are plotted.

The state of the robot 2 is represented as a point on a vector plane (two-dimensional vector space) whose bases are θ1 and θ2. More specifically, the state of the robot 2 is represented by a point on a plane, which is illustrated in FIG. 4, defined by θ1 and θ2 as axes. A state of the robot 2 where the position of the arm 2A is indicated in FIG. 3 by a solid line is defined as a first state. The first state of the robot 2 is indicated by a point P1 on the plane in FIG. 4.

When the robot 2 moves or changes the attitude thereof, the robot 2 enters another state. The state of the robot 2 is assumed here to change from the first state to a second state. A state of the robot 2 where the position of the arm 2A is indicated in FIG. 3 by a broken line is defined as the second state. The second state of the robot 2 is indicated by a point P2 on the plane in FIG. 4.

The state of the robot 2 can be regarded as continuously changing or discretely changing. In the present embodiment, the state of the robot 2 is regarded as continuously changing. While the robot 2 is making a certain motion, the state of the robot 2 continuously changes. As the state of the robot 2 continuously changes, the values of the parameters for identifying the state of the robot 2 continuously change. The point in the configuration space, such as the vector plane illustrated in FIG. 4, corresponding to the state of the robot 2 continuously moves and draws a trajectory in the configuration space. When the state of the robot 2 changes from the first state to the second state, a trajectory of the point corresponding to the state of the robot 2 can be drawn as one of various routes connecting P1 and P2. For example, the trajectory can be drawn as a straight line connecting P1 and P2 as indicated by a solid line in FIG. 4 or a curve connecting P1 and P2 as indicated by a broken line.

Figure 5:
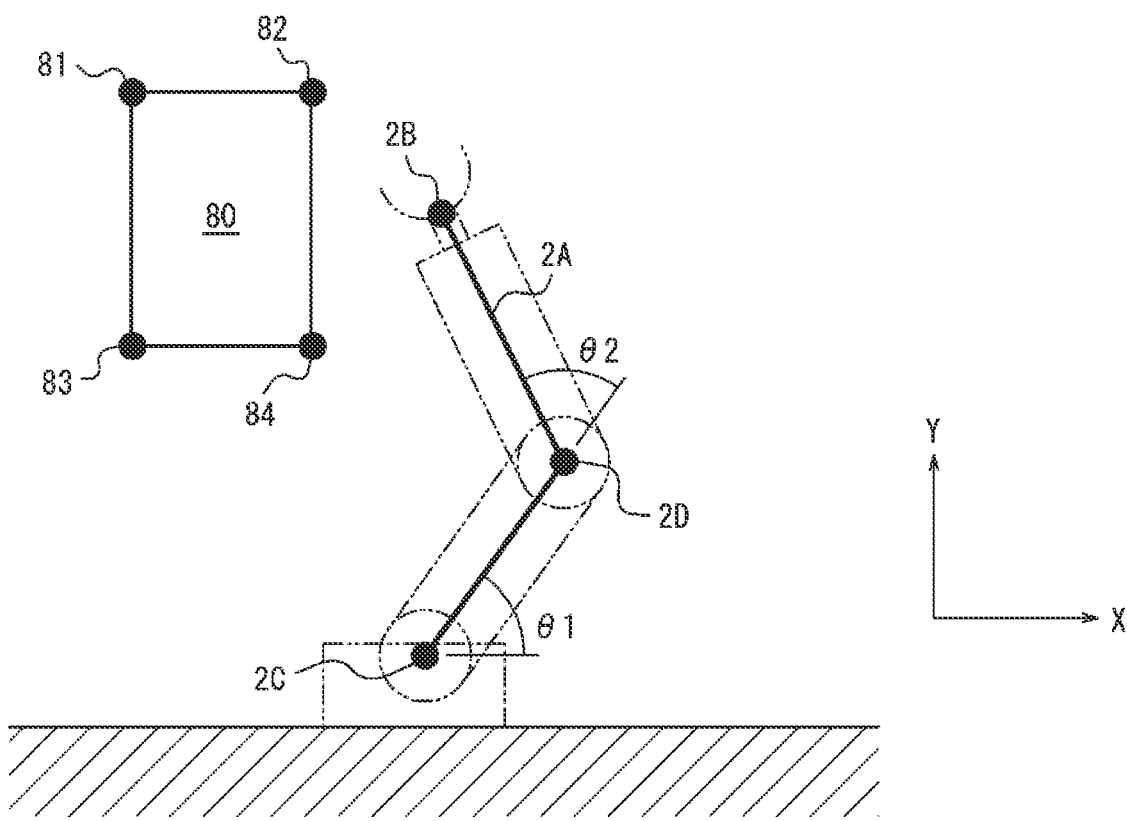
FIG. 5 is a diagram illustrating an example of an obstacle located in a space where the robot moves.

As illustrated in FIG. 5, an obstacle 80 is assumed to exist in a real space where the robot 2 moves. The obstacle 80 is represented as a rectangle including four vertices 81 to 84. The interference area calculation section 32 obtains the vertices of the obstacle 80 and coordinates (positional information) of the vertices. The interference area calculation section 32 may obtain spatial point cloud information regarding each of objects clustered by the recognition unit 50 and determine at least some of points included in the spatial point cloud information regarding the object as vertices of the object. The interference area calculation section 32 calculates states of the robot 2 at a time when at least part of the robot 2 interferes with the vertices of the obstacle 80. In a plurality of states of the robot 2, at least part of the robot 2 interferes with the vertex 81. The plurality of states of the robot 2 is represented as a set of points or a trajectory or an area defined by continuous points in the configuration space. That is, the states of the robot 2 when at least part of the robot 2 interferes with the vertex 81 are represented as a set of points or a trajectory or an area drawn by continuous points in the configuration space.

Figure 6:
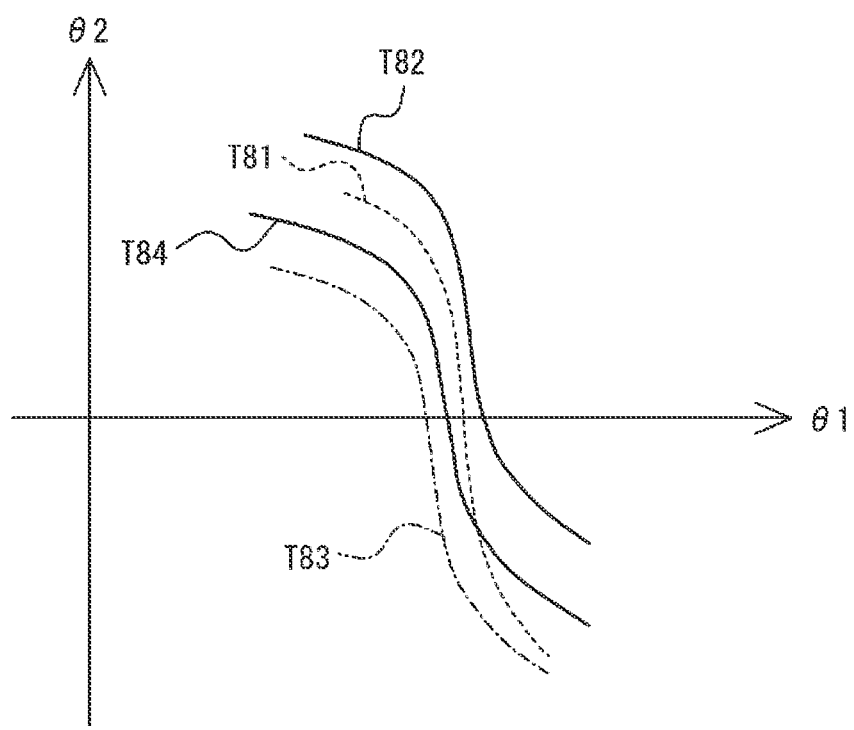
FIG. 6 is a diagram illustrating an example of trajectories (interference areas) obtained by representing, in the configuration space, combinations of the angles of the joints at times when the robot interferes with vertices of the obstacle.

As illustrated in FIG. 6, for example, the interference area calculation section 32 can draw, on the plane defined by θ1 and θ2 as axes, a trajectory T81 indicating the states of the robot 2 at a time when at least part of the robot 2 interferes with the vertex 81. The interference area calculation section 32 can also draw trajectories T82, T83, and T84 indicating states of the robot 2 at a time when at least part of the robot 2 interferes with the vertices 82, 83, and 84, respectively.

The values of the parameters when at least part of the robot 2 interferes with an object such as the obstacle 80 will also be referred to as interference values. Sets of points, trajectories, or areas indicating states of the robot 2 at times when at least part of the robot 2 interferes with an object such as the obstacle 80 are generically referred to as interference areas. That is, the interference area calculation section 32 generates interference areas as sets of points, trajectories, or areas in the configuration space corresponding to interference values.

Among the parameters for identifying the state of the robot 2, ones that affect interference with at least one object in a real space will be referred to as interference parameters. The control unit 30 (interference area calculation section 32) may obtain, as interference values, the values of the interference parameters at times when the robot 2 interferes with a plurality of vertices and determine interference areas encompassing the interference values in a configuration space whose bases are the interference parameters.

If the point indicating the state of the robot 2 is located outside the interference areas in the configuration space, the interference area calculation section 32 can determine that the robot 2 does not interfere with an object such as the obstacle 80. The interference area calculation section 32, therefore, can determine, on the basis of the interference areas generated in the configuration space, whether the robot 2 can move in a real space while avoiding an object such as the obstacle 80.

More specifically, the interference area calculation section 32 assumes a motion at a time when the robot 2 performs an operation and generates a set of points, a trajectory, or an area in the configuration space corresponding to states of the robot 2 achieved by the robot 2 during the assumed motion. The interference area calculation section 32 may assume the motion of the robot 2 on the basis of physical information regarding the robot 2 obtained from the robot information obtaining unit 40. Points, a trajectory, or an area in the configuration space indicating states achieved by the robot 2 during a motion will be generically referred as a motion area.

If a motion area corresponding to an assumed motion of the robot 2 does not overlap interference areas at all, the interference area calculation section 32 may determine that the robot 2 does not interfere with an object such as the obstacle 80 with the assumed motion. If determining that the robot 2 does not interfere with an object with the assumed motion, the interference area calculation section 32 may output a result of the determination to the planning unit 60.

If at least part of a motion area corresponding to an assumed motion of the robot 2 interferes with interference areas, the interference area calculation section 32 may determine that the robot 2 interferes with an object such as the obstacle 80 with the assumed motion. If determining that the robot 2 interferes with an object with the assumed motion, the interference area calculation section 32 may assume another motion, generate another motion area, and determine whether the robot 2 interferes with an object with this motion.

An interference area can be generated as sets of points, trajectories, or areas as illustrated in FIG. 6. In this case, points between the points, the trajectories, or the areas indicate states where the robot 2 does not interfere with an object. The interference areas, however, have been generated on the basis of some points on the object. Even in states indicated by points that are not included in the interference areas, therefore, the robot 2 can interfere with at least part of the object.

Figure 7:
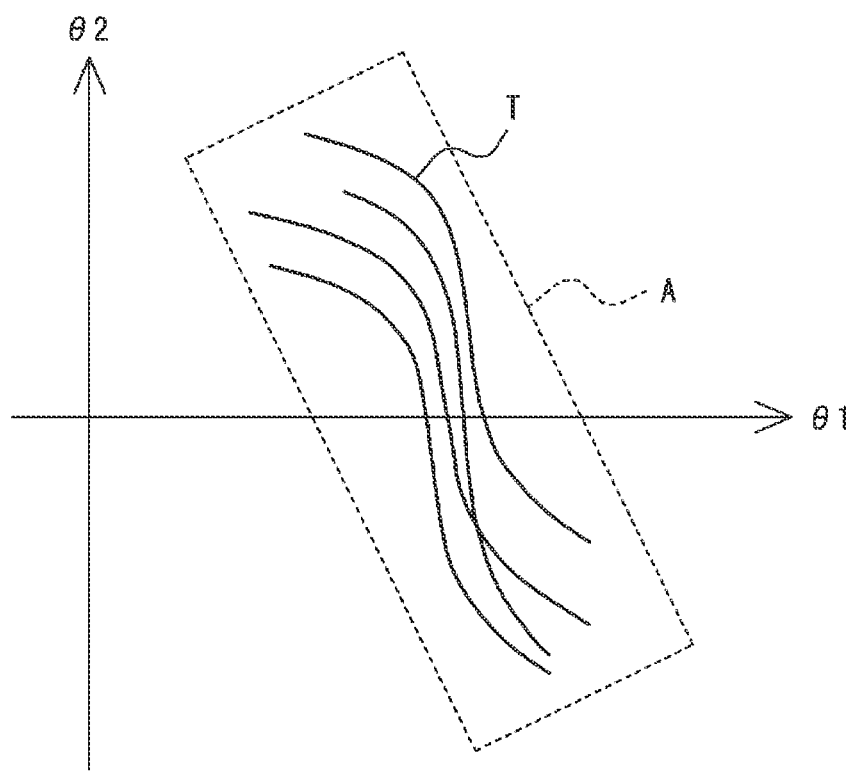
FIG. 7 is a diagram illustrating an example of an area encompassing the interference areas illustrated in FIG. 6.

A configuration space approximation section 34 of the control unit 30, therefore, newly generates an area encompassing the points, the trajectories, or the areas constituting the interference areas. The area newly generated by the configuration space approximation section 34 will also be referred to as a corrected interference area. As illustrated in FIG. 7, for example, the configuration space approximation section 34 may newly generate, as a corrected interference area, area A that is indicated by a broken-line rectangle and that includes all the four trajectories T. When the configuration space is two-dimensional, the configuration space approximation section 34 may generate, as a corrected interference area, an area having a shape of one of various plane figures such as polygons. When the configuration space is three-dimensional, the configuration space approximation section 34 may generate, as a corrected interference area, an area having a shape of one of various three-dimensional figures such as polyhedra. When the configuration space is a multidimensional space with four or more dimensions, the configuration space approximation section 34 may generate, as a corrected interference area, an area having one of various figures defined in the multidimensional space.

The configuration space approximation section 34 may generate a corrected interference area using an area encompassing interference areas generated in the configuration space as an approximate area. The configuration space approximation section 34 may generate, for example, a corrected interference area having a simple shape by approximating an area encompassing interference areas with a simple figure. More specifically, when the configuration space is two-dimensional, the configuration space approximation section 34 may generate a corrected interference area by approximating interference areas with a simple plane figure such as a triangle or a square. When the configuration space is three-dimensional, the configuration space approximation section 34 may generate a corrected interference area by approximating interference areas with a simple polyhedron such as a rectangular cuboid or a cube. In other words, in the present embodiment, the interference determination device 20 can approximate interference areas with a simple figure even when the configuration space has three or more dimensions.

The interference area calculation section 32 may obtain the corrected interference area from the configuration space approximation section 34 and determine, on the basis of the corrected interference area, whether the robot 2 interferes with an object.

<<Planning Unit 60>>

The planning unit 60 obtains, from the control unit 30, information regarding a motion of the robot 2 determined to not interfere with objects such as obstacles 80 and, from the robot information obtaining unit 40, physical information regarding the robot 2. The information regarding a motion of the robot 2 will also be referred to as motion information. The planning unit 60 plans, on the basis of the motion information and the physical information regarding the robot 2, a route of the robot 2 at a time when the robot 2 performs an operation and velocity or acceleration of the robot 2 at each of positions on the planned route. The planning unit 60 outputs information for identifying the planned route and the velocity or the acceleration at each position on the route to the operation amount generation device 70. The information for identifying the route planned by the planning unit 60 and the velocity or the acceleration at each position on the route will also be referred to as plan information.

The planning unit 60 includes a route planning section 62 and a motion planning section 64. The route planning section 62 plans a route along which each part of the robot 2 moves. More specifically, the route planning section 62 may represent, with spatial coordinate information defined in an XYZ coordinate system, a start point, an end point, or a via point of a route along which each part of the robot 2 moves. The route planning section 62 may represent an attitude of each part of the robot 2 at each position included in the route of the robot 2 as the angle of each joint 2C of the robot 2. The motion planning section 64 plans velocity, angular velocity, acceleration, or angular acceleration of the robot 2 at each position included in the route of the robot 2.

As described above, the interference determination device 20 plans a motion of the robot 2 such that the robot 2 does not interfere with other objects and outputs plan information to the operation amount generation device 70.

The control unit 30 may store, in the storage unit, spatial information such as spatial point cloud information, information regarding a plurality of obtained or generated vertices and coordinates of the vertices, or information regarding interference values, interference areas, or corrected interference areas. When interference is determined a plurality of times in this case, obtained or generated information and past information obtained or generated before may be compared with each other, and if identicalness or a certain degree of similarity is observed, the control unit 30 may output plan information regarding a route and a motion planned in the past. If partial identicalness or similarity is observed, the control unit 30 may plan a route or a motion of the robot 2 only in consideration of other parts that are not identical or similar. Whether identicalness or the certain degree of similarity is observed may be determined on the basis of differences in positions of a plurality of vertices or whether corrected interference areas include interference values or the like.

<Operation Amount Generation Device 70>

The operation amount generation device 70 generates an amount of operation for the robot 2 and outputs the amount of operation to the robot 2 such that the robot 2 can be appropriately controlled on the basis of plan information obtained from the planning unit 60 of the interference determination device 20. The amount of operation for the robot 2 may include, for example, information for controlling an output of a motor that drives each part of the robot 2, such as the joint 2C. The operation amount generation device 70 may include an arm control unit that generates an amount of operation for the arm 2A of the robot 2 and an end effector control unit that generates an amount of operation for the end effector 2B of the robot 2.

(Example of Operation of Interference Determination Device 20)

As described above, the interference determination device 20 assumes a motion of the robot 2 and determines whether at least part of the robot 2 interferes with an object with the assumed motion. The interference determination device 20 determines, on the basis of a result of the determination as to interference between the robot 2 and an object, a route of a motion of the robot 2 and the like.

The interference determination device 20 may perform a method for determining interference including a procedure in a flowchart of FIG. 8. The method for determining interference may be achieved as a program for determining interference to be executed by a processor that achieves the interference determination device 20. The program for determining interference may be stored in a non-transitory computer-readable medium.

The spatial information obtaining unit 52 obtains spatial information (step S1). The spatial information obtaining unit 52 obtains, as the spatial information, spatial point cloud information regarding objects in a space where the robot 2 moves, such as obstacles 80.

The recognition unit 50 clusters the objects on the basis of the spatial information (step S2). More specifically, the recognition unit 50 classifies the spatial point cloud information regarding the objects included in the spatial information for each object to generate spatial point cloud information regarding each object.

The control unit 30 generates interference areas (S3). More specifically, the interference area calculation section 32 of the control unit 30 calculates interference values corresponding to the objects in the space where the robot 2 moves. The interference area calculation section 32 represents the calculated interference values as sets of points, trajectories, or areas in a configuration space to generate interference areas including the sets of points, the trajectories, or the areas.

The control unit 30 generates a corrected interference area (step S4). More specifically, the configuration space approximation section 34 of the control unit 30 generates a new area including the interference areas generated by the interference area calculation section 32. The configuration space approximation section 34 may generate, as the new area, an area having a shape of a simple figure including the interference areas.

The control unit 30 generates a motion area (step S5). More specifically, the interference area calculation section 32 of the control unit 30 assumes a motion of the robot 2. The interference area calculation section 32 calculates possible values of the parameters of the robot 2 with the assumed motion. The interference area calculation section 32 generates a motion area including sets of points, trajectories, or areas by representing the calculated values of the parameters as the sets of points, the trajectories, or the areas.

The control unit 30 determines whether at least part of the robot 2 interferes with an object (step S6). More specifically, the control unit 30 determines, on the basis of the motion area and the corrected interference area, whether at least part of the robot 2 interferes with an object such as an obstacle 80 when the robot 2 makes the assumed motion. If the entirety of the motion area does not overlap the corrected interference area, the control unit 30 determines that the entirety of the robot 2 does not interfere with an object with the assumed motion. If at least part of the motion area overlaps the corrected interference area, the control unit 30 determines that at least part of the robot 2 interferes with an object with the assumed motion.

If determining that at least part of the robot 2 interferes with an object (step S6: YES), the control unit 30 returns to the procedure in step S5 and assumes a motion and generates a motion area again. If determining that the entirety of the robot 2 does not interfere with an object (step S6: NO), the control unit 30 outputs motion information to the planning unit 60 (step S7). The control unit 30 outputs, as the motion information, information regarding the motion with which the entirety of the robot 2 does not interfere with an object.

The planning unit 60 generates plan information on the basis of the motion information (step S8). The planning unit 60 outputs the generated plan information to the operation amount generation device 70.

The interference determination device 20 ends the execution of the procedure in the flowchart of FIG. 8 after performing the procedure in step S8.

Short Summary of Present Embodiment and Comparison with Comparative Examples

As described above, in the present embodiment, the interference determination device 20 calculates interference values of the robot 2 for vertices of objects in a space where the robot 2 moves, such as obstacles 80, and generates interference areas in a configuration space. The interference determination device 20 generates a corrected interference area encompassing all the interference areas corresponding to the vertices of the objects. The interference determination device 20 assumes a motion of the robot 2 and generates a motion area corresponding to the assumed motion in the configuration space. The interference determination device 20 determines, on the basis of the corrected interference area and the motion area, whether the robot 2 interferes with an object with the assumed motion. The interference determination device 20 generates a motion with which the robot 2 does not interfere with an object and generates plan information regarding the motion.

Here, in a determination method in a comparative example, interference values may be calculated for the entirety of an object. When interference values are calculated for the entirety of an object, the amount of processing is larger than when interference values are calculated for vertices of an object. When the robot 2 is represented by line segments, for example, whether surfaces of an object and the line segments representing the robot 2 intersect with each other is determined in order to calculate interference values for the entirety of the object. When interference values are calculated for vertices of an object as in the method for determining interference according to the present embodiment, on the other hand, whether the line segments representing the robot 2 pass the vertices may just be determined. In order to determine whether surfaces of an object and the segments intersect with each other, the surfaces of the object need to be expressed by numerical expressions, which makes the amount of processing larger than when only whether the line segments pass points is checked. In the present embodiment, therefore, the interference determination device 20 can reduce a calculation load for causing the robot 2 to avoid an object by calculating interference values for vertices of the object. As a result, convenience of the robot 2 improves.

In the present embodiment, the method for determining interference makes motion planning for the robot 2 more real-time by reducing the calculation load. As the motion planning is made more real-time, responses of the robot 2 become faster. As a result, safety of the robot 2 can improve. In the present embodiment, the method for determining interference can reduce a load for newly calculating interference values even after the configuration of the arm 2A or the end effector 2B of the robot 2 is changed. The interference determination for the robot 2, therefore, can promptly reflect a change to the configuration of the robot 2.

In a determination method in another comparative example, the amount of processing for the interference determination can be reduced by representing the robot 2 or an object in a two-dimensional space and reducing the amount of information. This method can be applied to a horizontally articulated robot, but cannot be applied to, for example, a six-axis manipulator capable of freely moving in a three-dimensional space. In the case of a six-axis manipulator, a position or an attitude of each link needs to be taken into consideration for calculation of a planned route that avoids interference areas, which inevitably makes the amount of calculation enormous. Even if interference areas are mapped onto a configuration space of the robot 2 and a route is planned in the configuration space in a comparative example, various problems still arise. Interference with obstacles in a real space where the robot 2 moves can be determined, for example, by mapping interference areas onto the configuration space, connecting end points of mapped objects, and approximating the mapped objects with polygons while fixing some of the plurality of parameters of the robot 2 and varying the other parameters. In this method, almost all information regarding obstacles existing in a real space is mapped. A calculation load, therefore, is larger than when only vertices of objects are mapped in the present embodiment. That is, the calculation load can be reduced by mapping vertices of objects in the present embodiment. As a result, the convenience of the robot 2 improves.

In a determination method in another comparison example, the amount of calculation for the interference determination can be reduced by approximating obstacles with spheres, geometrically calculating positional relationships between the components of the robot 2 and the spheres, mapping interference areas onto the configuration space, and approximating the interference areas with simple figures. In this method, if shapes of obstacles are significantly different from spheres, the robot 2 is undesirably determined, as a disadvantage of the spherical approximation of obstacles, to interfere at positions where obstacles are not actually present. That is, in this method, applicable shapes of obstacles are limited. In the present embodiment, on the other hand, since vertices of objects are mapped in the method for determining interference, shapes of obstacles subjected to the interference determination are hardly limited. As a result, the convenience of the robot 2 improves. By mapping vertices of objects, the interference determination can easily reflect shapes of obstacles. As a result, versatile trajectories with which the robot 2 autonomously avoids objects such as obstacles 80 can be generated.

Other Embodiments

Other embodiments will be described hereinafter.
<Singular Points and Potentials>
The robot 2 has singular points, at which the robot 2 enters an inoperable state. Singular points can be represented as points or areas in the configuration space. The interference area calculation section 32 of the interference determination device 20 may determine validity of the motion of the robot 2 on the basis of not only interference areas but also singular points in the configuration space. The interference area calculation section 32 can cause the robot 2 to automatically avoid singular points just by taking into consideration interference areas without taking into consideration singular points. That is, by determining the validity of the motion of the robot 2 in the configuration space, singular points can be easily avoided.

The interference area calculation section 32 may provide potentials at singular points or positions near the singular points in the configuration space and determine the validity of the motion of the robot 2 in such a way as to avoid the potentials. Alternatively, the interference area calculation section 32 may provide potentials at a plurality of vertices, interference areas, or positions near the vertices or the interference areas in the configuration space and determine the validity of the motion of the robot 2 in such a way as to avoid potentials. Alternatively, the interference area calculation section 32 may provide potentials in a corrected interference area or a position near the corrected interference area in the configuration space and determine the validity of the motion of the robot 2 in such a way as to avoid the potentials. Each potential corresponds to, for example, a value determined on the basis of a distance between the corresponding interference area or singular point and the point indicating the state of the robot 2. Each potential has a higher value as the point indicating the state of the robot 2 becomes closer to the corresponding interference area or singular point. When assuming a motion of the robot 2, the interference area calculation section 32 may assume a motion of the robot 2 such that an integral or a sum of potentials in different states of the robot 2 achieved during the motion becomes small. In doing so, the motion of the robot 2 can be assumed such that the robot 2 does not become too close to objects such as obstacles 80 or singular points.

The interference area calculation section 32 may provide potentials in the configuration space and select a motion route such that a sum or an integral based on the length of the motion route of the robot 2 becomes small. When, as a result, a plurality of routes of the robot 2 for avoiding interference areas or singular points is possible, the sum or the integral with a long route is undesirably large compared to in the case of a short route. In this case, the interference area calculation section 32 may select a route with a small sum or integral in order to control the motion of the robot 2 such that the route of the robot 2 becomes short.

<Reflection of Shape of Robot 2>
The interference area calculation section 32 of the control unit 30 may calculate interference values further on the basis of the shape of the robot 2 in a real space.

The control unit 30 may determine interference further on the basis of the shape of the robot 2. More specifically, the interference area calculation section 32 may calculate interference values of vertices of objects such as obstacles 80 while regarding the arm 2A of the robot 2 as line segments, and then calculate interference values that take into consideration an actual shape of the arm 2A. By performing calculation while regarding the arm 2A as line segments and then taking into consideration the shape of the arm 2A, a load of calculating interference values can be reduced.

<Selection of Parameters for which Interference Values are to be Calculated>

The interference area calculation section 32 of the control unit 30 may calculate interference values for parameters that affect the position and the attitude of the robot 2 to a certain degree or more. More specifically, the interference area calculation section 32 may calculate interference values for some of the parameters for identifying the state of the robot 2.

The interference area calculation section 32 may give order of priority to the parameters for identifying the state of the robot 2 and calculate interference values for parameters higher in the order. The interference area calculation section 32 may calculate interference values for top n parameters among the parameters for identifying the state of the robot 2. The order of priority may be set on the basis of a ratio of the amount of change in coordinates of the robot 2 or the amount of change in an angle indicating the attitude to the amount of change in each parameter. As the amount of change in coordinates of the arm 2A or the amount of change in an angle of the arm 2A to the amount of change in each parameter increases, for example, the parameter may be ranked higher in the order of priority.

If the amount of change in coordinates of a certain part of the robot 2 becomes larger than or equal to a certain amount after each parameter is changed by a certain value, the interference area calculation section 32 may determine that the parameter affects the state of the robot 2 to the certain degree or more. The interference area calculation section 32 may determine a parameter that contributes to a certain percentage of the amount of change in the coordinates of the certain part of the robot 2 as one that affects the state of the robot 2 to the certain degree or more. The certain part of the robot 2 may be, for example, the end effector 2B located at the tip of the robot 2.

The interference area calculation section 32 may calculate a ratio of the amount of change relating to each parameter of the robot 2 to the total amount of change relating to all the parameters by calculating a certain amount of change in the robot 2 at a time when the parameter is changed by a certain value. When a parameter that causes a change 5% or more in the total amount of change and another parameter that causes a change less than 5% in the total amount of change exist, for example, the interference area calculation section 32 may determine the parameter that causes the change 5% or more in the total amount of change as one that affects the state of the robot 2 to the certain degree or more. The certain percentage is not limited to 5%, and may be one of various percentages including 10%, 15%, and 20%, instead. When differences in the ratio of the amount of change to the total amount of change between the parameters fall within 10%, for example, the interference area calculation section 32 may determine that all the parameters affect the state of the robot 2 to the certain degree or more.

The robot 2 is specifically assumed to include six joints (first to sixth joints). The interference area calculation section 32 calculates the amount of movement of coordinates of the tip of the robot 2 caused by changing an angle of each of the six joints by a certain value. The interference area calculation section 32 calculates the total amount of movement of the coordinates of the tip of the robot 2 corresponding to the joints. The interference area calculation section 32 calculates a ratio of the amount of movement of the coordinates of the tip of the robot 2 corresponding to each joint to the total amount of movement of the coordinates of the tip of the robot 2. The ratio of the amount of movement corresponding to the first joint is assumed to be 60%. The ratio of the amount of movement corresponding to the second joint is assumed to be 20%. The ratio of the amount of movement corresponding to the third joint is assumed to be 10%. The ratio of the amount of movement corresponding to the fourth joint is assumed to be 5%. The ratio of the amount of movement corresponding to the fifth joint is assumed to be 3%. The ratio of the amount of movement corresponding to the sixth joint is assumed to be 2%. When the certain percentage is set at 15%, for example, the angles of the first and second joints are determined as parameters that affect the state of the robot 2 to the certain degree or more. When the certain percentage is set at 5%, for example, the angles of the first to fourth joints are determined as parameters that affect the state of the robot 2 to the certain degree or more. In this case, the sixth joint is located at a farthest end of the robot 2, and the first joint is located farthest from the tip.

<Recognition of Vertices of Objects in Real Space>

The recognition of vertices of objects will be further described hereinafter. The recognition of vertices of objects may be achieved by various means, that is, the recognition may be achieved by the above-described means or means other than those described above. Alternatively, the recognition of vertices of objects may be achieved by an appropriate combination of the various means described herein.

As described above, the recognition unit 50 may recognize an object without generating spatial point cloud information and output information regarding an outer shape of the object as recognition information. In this case, the interference area calculation section 32 of the control unit 30 may generate an approximate figure encompassing the outer shape of the object. When the robot 2 moves in two dimensions, the interference area calculation section 32 may approximate an outer shape of an object with a plane figure such as a polygon. When the robot 2 moves in three dimensions, the interference area calculation section 32 may approximate an outer shape of an object with a three-dimensional figure such as a polyhedron. The three-dimensional figure may be, for example, a rectangular cuboid, a regular polyhedron (a regular tetrahedron, a regular hexahedron, a regular octahedron, a regular dodecahedron, or a regular icosahedron), or a prism such as a triangular prism or a square prism. In this case, even when an object has a curved surface, the object may be approximated with a polyhedron. The interference area calculation section 32 calculates an interference value of each parameter of the robot 2 while regarding the vertices of the approximate figure as the vertices of the object. The approximate figure need not be similar to the outer shape of the object. When the object is triangular, for example, a square approximate figure may be obtained, or a triangle may be approximated with a plurality of squares.

Alternatively, the recognition unit 50 may obtain spatial point cloud information and estimate an outer shape of an object on the basis of the spatial point cloud information. In this case, for example, the recognition unit 50 can estimate an outer shape of an object by clustering point cloud information including similar attribute information. More specifically, when different pieces of point information include the same or similar X coordinates, for example, the recognition unit 50 can estimate that Y information and Z information of the pieces of point information are point cloud information indicating a YZ plane of an object.

The interference area calculation section 32 may generate an approximate figure including at least part of an outer shape of an object. The interference area calculation section 32 may then obtain vertices of an approximate figure as vertices of the object and determine interference. An approximate figure may be a figure encompassing an outer shape of one object. An approximate figure may be a figure including part of an outer shape of an object, that is, a plurality of approximate figures may together encompass one object, instead. When a plurality of approximate figures together encompass one object, for example, the interference area calculation section 32 can accurately approximate an object having a complex shape. In this case, the interference area calculation section 32 can create a plurality of approximate figures by finely clustering spatial point cloud information regarding one object.

When the interference area calculation section 32 generates a plurality of approximate figures and the plurality of approximate figures includes an overlap area where the plurality of approximate figures overlaps, the interference area calculation section 32 may exclude vertices inside the overlap area from the interference determination. When a plurality of approximate figures includes an overlap area, the interference area calculation section 32 may determine interference on the basis of vertices of an outer shape formed by the plurality of approximate figures. That is, the interference area calculation section 32 may obtain vertices while regarding a plurality of approximate figures including an overlap area as one approximate figure.

When the interference area calculation section 32 generates a plurality of approximate figures, each of the plurality of approximate figures may be a plurality of polyhedrons, each of which includes the same number of surfaces. That is, for example, the interference area calculation section 32 may generate an approximate figure of an object using only rectangular cuboids and cubes. In this case, the interference area calculation section 32 determines interference while determining vertices of polyhedrons such as rectangular cuboids and cubes as vertices of an object. The plurality of approximate figures may be obtained by approximating a plurality of objects or one object.

When the interference area calculation section 32 determines a plurality of approximate figures as a plurality of polyhedrons including the same number of surfaces, the plurality of polyhedrons may be polyhedrons with the same orientation. The polyhedrons with the same orientation mean, when one of the polyhedrons includes a bottom surface parallel to an XY plane and a side surface parallel to a Z-axis, for example, that the other polyhedrons also include similar bottom surfaces and side surfaces. The plurality of polyhedrons may be similar to one another.

When the interference area calculation section 32 has obtained spatial point cloud information as recognition information regarding an object, the interference area calculation section 32 may regard points included in the spatial point cloud information as vertices of the object. The interference area calculation section 32 may obtain spatial point cloud information and information regarding an outer shape of an object as recognition information regarding the object, instead. In this case, too, the interference area calculation section 32 may generate an approximate figure encompassing the outer shape of the object and regard vertices of the approximate figure as vertices of the object.

Alternatively, the interference area calculation section 32 may represent an object with a figure encompassing an outer shape of the object and regard vertices of the figure as vertices of the object. When an object is represented by spatial point cloud information, for example, the interference area calculation section 32 may represent the object with a figure having vertices fewer than points included in the spatial point cloud information. The interference area calculation section 32 may represent an object with a figure having vertices as many as points included in spatial point cloud information or a figure having vertices more than points included in spatial point cloud information, instead. The interference area calculation section 32 may represent an object such that a data format of the object becomes simple. In doing so, the load of calculating interference values can be reduced. The interference area calculation section 32 may represent an object with a figure including points that interpolate vertices away from each other by a certain distance or more such that distances between vertices of the figure representing the object become smaller than the certain distance, instead. In doing so, failure to calculate interference values due to the robot 2 passing between vertices can be reduced.

Alternatively, the recognition unit 50 may obtain spatial point cloud information and then obtain point information in the spatial point cloud information corresponding to vertices of an object as vertices. Alternatively, the recognition unit 50 may obtain a polyhedron with which an object has been approximated on the basis of the obtained point information and then obtain vertices of the polyhedron. The point information corresponding to vertices of an object includes information defined as the vertices of the object along with information indicating the vertices of the object. The information defined as the vertices of the object includes, for example, virtual vertices and refers to vertices defined on a curved surface, vertices defined by aggregating a plurality of vertices, or the like.

The recognition unit 50 may include targets of an operation as targets to be avoided. That is, the recognition unit 50 may obtain spatial point cloud information and then obtain targets of an operation and vertices of at least one object including obstacles 80. In this case, the recognition unit 50 need not recognize the objects while distinguishing the targets of the operation with a background or the objects such as the obstacles 80, which are not targets of the operation, or may distinguish these and then determine the targets of the operation, the obstacles 80, and the like as targets to be avoided.

The recognition unit 50 may process or recognize a plurality of objects as one object on the basis of a certain criterion. More specifically, for example, the recognition unit 50 may recognize a plurality of objects located within a certain range as one object. The certain range may be set in advance. Alternatively, the recognition unit 50 may obtain thickness of the arm 2A of the robot 2 and determine an obtained value as the certain range. When potentials have been provided, the recognition unit 50 may set the certain range on the basis of distances by which the potentials have been provided. In this case, when a plurality of objects is densely arranged, for example, the recognition unit 50 need not obtain vertices of each of the plurality of objects and obtains outermost vertices among the vertices of the plurality of objects. When the recognition unit 50 obtains approximate figures of objects, for example, the recognition unit 50 may obtain at least one approximate figure for each object.

The recognition unit 50 may process or recognize a plurality of vertices as one vertex on the basis of a certain criterion. More specifically, for example, the recognition unit 50 may recognize a plurality of vertices located within a certain range as one vertex. The certain range may be set in advance. Alternatively, the recognition unit 50 may obtain the thickness of the arm 2A of the robot 2 and determine an obtained value as the certain range. When aggregating a plurality of vertices, the recognition unit 50 may aggregate vertices of different objects. When aggregating a plurality of vertices, the recognition unit 50 may aggregate a plurality of vertices of a single object, instead.

The control unit 30 may divide obtained recognition information, spatial information, or spatial point cloud information into pieces of information for a plurality of areas and determine interference on the basis of the pieces of information. In this case, for example, the recognition unit 50 may process or recognize a plurality of objects in an area as one object on the basis of a certain criterion. When one object spans a plurality of areas, on the other hand, the recognition unit 50 may process or recognize part of the object in each area as one object. That is, when one object spans a first area and a second area, for example, the recognition unit 50 may regard part of the object in the first area as a first object and part of the object in the second area as a second object. In this case, the recognition unit 50 may regard a boundary between the first area and the second area as part of outlines of the first and second objects. The recognition unit 50 may also divide an imaging area or a motion area by a certain spatial volume and process or recognize a plurality of areas. The spatial volume may be appropriately set within a range where a level of accuracy necessary to determine interference is achieved.

The control unit 30 may set an operation start point 6 near a workpiece 8 such as a target to be gripped, instead. The control unit 30 may skip the interference determination on a motion route between the operation start point 6 and the workpiece 8. Alternatively, the control unit 30 may execute an algorithm or a program that does not accompany the interference determination on the motion route between the operation start point 6 and the workpiece 8. In this case, the control unit 30 may set the operation start point 6 near the workpiece 8 on the basis of a certain criterion. More specifically, for example, the control unit 30 may set the operation start point 6 within a certain range from the workpiece 8. The certain range may be set in advance. When potentials have been provided, the control unit 30 may set the operation start point 6 on the basis of distances by which the potentials have been provided. The control unit 30 may set the operation start point 6, for example, at a position immediately before a value of a potential becomes large.

The control unit 30 may set an operation target point 7 near a workpiece 8 such as a target to be gripped. The control unit 30 may skip the interference determination on a motion route between the operation target point 7 and the workpiece 8. Alternatively, the control unit 30 may execute an algorithm or a program that does not accompany the interference determination on the motion route between the operation target point 7 and the workpiece 8. In this case, the control unit 30 may set the operation target point 7 near the workpiece 8 on the basis of a certain criterion. More specifically, for example, the control unit 30 may set the operation target point 7 within a certain range from the workpiece 8. The certain range may be set in advance. When potentials have been provided, the control unit 30 may set the operation target point 7 on the basis of distances by which the potentials have been provided. For example, the control unit 30 may set the operation target point 7 at a position immediately before a value of a potential becomes large.

When the arm 2A of the robot 2 has a shape of a pillar, the interference area calculation section 32 may enlarge a figure representing an object outward on the basis of a shape of a cross-section perpendicular to an axis of the shape of the pillar of the arm 2A. In this case, the interference area calculation section 32 may calculate interference values while regarding the arm 2A of the robot 2 as line segments. In doing so, the load of calculating interference values can be reduced.

The configurations described above can be paraphrased as follows. The control unit 30 determines interference between the robot 2 and an object. The control unit 30 obtains a plurality of vertices of at least one object within a motion range of the robot 2 in a real space and positional information regarding the plurality of vertices. The control unit 30 determines interference between the robot 2 and the object in the real space on a basis of the plurality of vertices and the positional information regarding the plurality of vertices.

The control unit 30 may obtain the plurality of vertices of only an object that can interfere with a motion of the robot 2 among the at least one object. In this case, for example, the control unit 30 may recognize an object with the recognition unit 50 and then calculate a motion route of the robot 2 only on the basis of an obstacle 80. Alternatively, for example, the control unit 30 may calculate a motion route of the robot 2 only on the basis of an object located between an operation start point 6 and an operation target point 7. The control unit 30 may set the operation start point 6 and the operation target point 7 such that only the obstacle 80 is located between the operation start point 6 and the operation target point 7.

The control unit 30 may exclude, among the at least one object, the robot 2 as a target from which the plurality of vertices is obtained. In this case, for example, the control unit 30 may recognize an object with the recognition unit 50 and then exclude the robot 2.

The control unit 30 may obtain the plurality of vertices of, among the at least one object, at least one object within an operation range of the robot 2, the operation range being located inside the motion range.

The control unit need not use, among the at least one object, a workpiece 8 of the robot 2 to determine the interference. The workpiece 8 may include an object relating to an operation performed by the robot 2. More specifically, the workpiece 8 may include, along with a target to be gripped by the end effector 2B, for example, a tray on which the target is disposed or a tray to which the target is to be moved. Vertex information regarding the workpiece 8 can be used for object recognition or the like. Even when the control unit 30 obtain vertex information, therefore, the control unit 30 need not use the vertex information. In this case, the control unit 30 may store the obtained vertex information.

The control unit 30 may obtain an approximate figure including part of the at least one object and then obtain vertices of the approximate figure as the plurality of vertices. The control unit 30 may obtain an approximate figure encompassing the at least one object and then obtain vertices of the approximate figure as the plurality of vertices of the at least one object.

When the at least one object includes a curved surface, the control unit 30 may obtain the curved surface as an approximate figure including a plurality of flat surfaces sharing at least one vertex.

When the at least one object or the approximate figure includes at least two vertices within a certain range, the control unit 30 may regard the at least two vertices as one vertex. In other words, when at least two vertices are located within a certain distance from each other, the control unit 30 may determine that the vertices are sufficiently close to each other and regard the vertices as one vertex.

<Configuration for Making Plurality of Determinations During Movement>

The control unit 30 may determine interference a plurality of times while the robot 2 is making a single motion. More specifically, the control unit 30 may make a plurality of determinations, for example, while the robot 2 is making a single movement. A single movement of the robot 2 may include, for example, movement of the robot 2 from an operation start point 6 to an operation target point 7. Second and later interference determinations may begin, for example, with "obtain spatial information" as illustrated in FIG. 8. In this case, the control unit 30 may, as described above, determine identicalness or similarity to past information and skip part of a process or processing.

With respect to frequency of the interference determination, when calculating interference between a moving target and the robot 2, for example, the control unit 30 may set the frequency of the interference determination in consideration of a distance from the robot 2 to the target, velocity of the arm 2A, and possible highest velocity of the target. More specifically, the moving target is assumed to be a human. If the arm 2A and the human are assumed to move at the same speed (e.g., 30 centimeters per second) in this case, the two (the arm 2A and the human) become closer to each other 60 centimeters per second in the worst case (when the two move toward each other). Even if intervals of calculation of interference are set at 1 second, the interference determination can be made in time when the two (the arm 2A and the human) are away from each other by 60 centimeters or more. In practice, the intervals of the calculation of interference are set shorter in consideration of errors of the sensors 3 or the cameras 4, time lags, control lags, braking distances, safety factors, and the like. The necessary frequency of the interference calculation differs depending on a situation. When the robot 2 performs operations in the immediately vicinity of humans, the frequency of the interference calculation is set, for example, at 10 times per second.

If a certain number of interference determinations cannot be made in time after a moving target is recognized within an effect range 5, the control unit 30 may slow down motion speed of the robot 2 or stop the motion of the robot 2. If a new object is recognized within the effect range 5, the control unit 30 may reduce the motion speed of the robot 2 or stop the motion. The above process may be performed even when a moving target or a new object is outside the motion range of the robot 2.

The frequency of the interference determination may be changed for each of motion types of the robot 2. When the robot 2 picks up a target to be gripped at an operation start point 6 and carries the target to an operation target point 7, for example, a frequency during a motion for picking up the target may be lower than that during a motion for carrying the target to the operation target point 7 after gripping the target. The frequency of the interference determination may be increased when a new object is recognized within the effect range 5.

<Cloud Processing of Interference Determination and Generation of Amount of Operation>

The interference determination and the generation of the amount of operation described above may be achieved as a cloud service or in an on-premises environment.

Although some embodiments of the robot control system 1 have been described above, modes where a method or a program for achieving the system or the apparatus or a storage medium (e.g., an optical disc, a magneto-optical disk, a CD-ROM, a CD-R, a CD-RW, a magnetic tape, a hard disk, or a memory card) storing the program is used may be employed in other embodiments of the present disclosure.

Embodiments of the program are not limited to an application program such as an object code compiled by a compiler or a program code executed by an interpreter, and may be a program module or the like incorporated into an operating system, instead. The program may or may not be configured such that a CPU on a control substrate performs all processing. The program may be executed partially or in its entirety by another processing unit provided for an extension board or an extension unit attached to the substrate as necessary, instead.

The drawings for explaining the embodiments of the present disclosure are schematic. Dimensional ratios and the like on the drawings do not necessarily match ones in reality.

Although the embodiments of the present disclosure have been described on the basis of the drawings and the examples, those skilled in the art can easily change or alter the embodiments in various ways on the basis of the present disclosure. The scope of the present disclosure, therefore, also includes such changes or alterations. For example, the functions and the like of the components may be rearranged insofar as no logical contradiction is caused, and a plurality of components may be combined together or further divided.

All the elements described in the present disclosure and/or all the disclosed methods or steps of processes may be combined together in any combination unless features included in the combination are mutually exclusive. Each of the features described in the present disclosure may be replaced by alternative features that serve for the same purposes, equivalent purposes, or similar purposes, unless explicitly denied. Each of the disclosed features, therefore, is just an example of a comprehensive set of the same or equivalent features, unless explicitly denied.

Embodiments of the present disclosure are not limited to any of the specific configurations in the above-described embodiments. Embodiments of the present disclosure may be extended to all the novel features described in the present disclosure or any combination thereof or all the novel methods or steps of processes described in the present disclosure or any combination thereof.

Terms such as "first" and "second" in the present disclosure are identifiers for distinguishing the corresponding components. The components distinguished with the terms such as "first" and "second" in the present disclosure may exchange the numbers thereof. For example, the first state may exchange "first" for "second", which are identifiers, with the second state. The identifiers are simultaneously exchanged. Even after the exchange of the identifiers, the components are still distinguished from each other. Identifiers may be removed. Components from which identifiers have been removed are distinguished from each other by reference numerals. The identifiers such as "first" and "second" in the present disclosure are not intended to be used as a sole basis for interpretation of order of the components or presence of an identifier with a smaller number.

The invention claimed is:

1. An interference determination device comprising:
a controller for determining interference between a robot and an object, the controller configured to
obtain a plurality of vertices of a figure encompassing an outer shape of at least one object within a motion range of the robot in a real space and positional information regarding the plurality of vertices, wherein a number of the plurality of vertices of the figure is fewer than a number of points included in spatial point cloud information representing the at least one object, and
determine interference between the robot and the object in the real space based on the plurality of vertices and the positional information.

2. The interference determination device according to claim 1, wherein the controller is further configured to determine the interference based on a shape of the robot.

3. The interference determination device according to claim 1, wherein the at least one object is an object that can interfere with a motion of the robot.

4. The interference determination device according to claim 1, wherein the controller is configured to exclude the robot as the at least one object.

5. The interference determination device according to claim 1, wherein the at least one object includes an object within an operation range of the robot, the operation range being located inside the motion range.

6. The interference determination device according to claim 1, wherein the at least one object, does not include a workpiece of the robot for the determination of interference.

7. The interference determination device according to claim 1, wherein the controller makes a plurality of determinations of interference while the robot is making one motion.

8. The interference determination device according to claim 1, wherein the controller is further configured to obtain an approximate figure including at least part of the at least one object and obtain vertices of the approximate figure as the plurality of vertices.

9. The interference determination device according to claim 8, wherein, the at least one object includes a curved surface, and the controller is further configured to obtain the curved surface as an approximate figure including a plurality of flat surfaces sharing at least one vertex.

10. The interference determination device according to claim 8, wherein, the at least one object or the approximate figure includes at least two vertices within a certain range, and the controller is configured to regard the at least two vertices as one vertex.

11. The interference determination device according to claim 1,
wherein, among parameters for identifying a state of the robot, a parameter that affects interference with the at least one object in the real space is defined as an interference parameter, and
the controller is configured to
obtain an interference value, the interference value being a value of the interference parameter at a time when the robot interferes with the plurality of vertices and
determine an interference area encompassing the interference value in a configuration space whose basis is the interference parameter.

12. The interference determination device according to claim 11, wherein the controller is further configured to calculate the interference value for a parameter that affects a position of the robot greater than or equal a predetermined amount.

13. The interference determination device according to claim 11, wherein the controller is configured to plan a route of the robot such that the value of the parameter does not interfere with the interference area in the configuration space during a motion of the robot.

14. A robot control system comprising:
the interference determination device according to claim 13;
an operation amount generation device for generating an operation amount for the robot based on the route planned by the interference determination device; and
the robot.

15. A method for determining interference, the method comprising:
obtaining a plurality of vertices of a figure encompassing an outer shape of at least one object within a motion range of the robot in a real space and positional information regarding the plurality of vertices, wherein a number of the plurality of vertices of the figure is fewer than a number of points included in spatial point cloud information representing the at least one object; and
determining interference between the robot and the object in the real space based on the plurality of vertices and the positional information.

* * * * *